(12) United States Patent
Shetty et al.

(10) Patent No.: US 10,367,861 B2
(45) Date of Patent: Jul. 30, 2019

(54) SYSTEM AND METHOD FOR DIGITAL AUDIO CONFERENCE WORKFLOW MANAGEMENT

(71) Applicant: HARMAN INTERNATIONAL INDUSTRIES, INCORPORATED, Stamford, CT (US)

(72) Inventors: Rudresha T. Shetty, Nivedita Nagar Mysore (IN); Raghunandan Ghagarvale, Chitradurga Hiriyur (IN)

(73) Assignee: Harman International Industries, Inc., Stamford, CT (US)

( * ) Notice: Subject to any disclaimer, the term of this patent is extended or adjusted under 35 U.S.C. 154(b) by 167 days.

(21) Appl. No.: 14/904,088

(22) PCT Filed: Jul. 11, 2014

(86) PCT No.: PCT/US2014/046330
§ 371 (c)(1),
(2) Date: Jan. 9, 2016

(87) PCT Pub. No.: WO2015/006681
PCT Pub. Date: Jan. 15, 2015

(65) Prior Publication Data
US 2016/0134668 A1 May 12, 2016

Related U.S. Application Data

(60) Provisional application No. 61/845,165, filed on Jul. 11, 2013.

(51) Int. Cl.
*H04L 29/06* (2006.01)
*H04R 29/00* (2006.01)
(Continued)

(52) U.S. Cl.
CPC ............ *H04L 65/403* (2013.01); *H04M 3/28* (2013.01); *H04M 3/42144* (2013.01);
(Continued)

(58) Field of Classification Search
CPC ..... H04L 65/403; H04R 3/005; H04R 29/004; H04R 29/008
See application file for complete search history.

(56) References Cited

U.S. PATENT DOCUMENTS 6,292,769 B1 * 9/2001 Flanagan ............ G06F 17/2827
704/277
8,300,078 B2 * 10/2012 Lovhaugen ........... G06F 3/0486
348/14.03
(Continued)

FOREIGN PATENT DOCUMENTS

CN 1606382 A 4/2005
CN 101086776 A 12/2007
(Continued)

OTHER PUBLICATIONS

Extended European Search Report for Application No. 14822334.0, dated Apr. 5, 2017, 12 pages.
(Continued)

*Primary Examiner* — Rasheed Gidado
(74) *Attorney, Agent, or Firm* — Brooks Kushman P.C.

(57) ABSTRACT

In one embodiment, a computer-program product embodied in a non-transitory computer read-able medium that is programmed to manage a digital audio conference including a plurality of conference units and each conference unit including a microphone is provided. The computer-program product includes instructions to receive first information corresponding to a layout of a venue that facilitates an audio conference for users of the plurality of conference units. The computer-program product further includes instructions to
(Continued)

store second information corresponding to an arrangement of a plurality of seats in the venue and to associate a first conference unit of the plurality of conference units to a first seat of the plurality of seats.

12 Claims, 15 Drawing Sheets

(51) Int. Cl.
  *H04M 3/56* (2006.01)
  *H04R 3/00* (2006.01)
  *H04M 3/28* (2006.01)
  *H04M 3/42* (2006.01)

(52) U.S. Cl.
  CPC ............ *H04M 3/56* (2013.01); *H04M 3/566* (2013.01); *H04M 3/568* (2013.01); *H04R 3/005* (2013.01); *H04R 29/004* (2013.01); *H04R 29/008* (2013.01)

(56) References Cited

U.S. PATENT DOCUMENTS

| | | | | |
|---|---|---|---|---|
| 8,890,922 | B2* | 11/2014 | Liu | H04N 5/23238 348/14.07 |
| 9,998,605 | B2* | 6/2018 | Bonarius | H04L 65/4038 |
| 2002/0101854 | A1* | 8/2002 | Siegrist | H04M 3/5183 370/352 |
| 2003/0103075 | A1* | 6/2003 | Rosselot | H04L 41/22 715/717 |
| 2003/0163537 | A1* | 8/2003 | Rohall | G06Q 10/107 709/206 |
| 2005/0164154 | A1* | 7/2005 | Solomon | G09B 7/00 434/350 |
| 2005/0213731 | A1* | 9/2005 | Rodman | H04L 12/66 379/202.01 |
| 2006/0088173 | A1* | 4/2006 | Rodman | H04R 1/025 381/92 |
| 2007/0050451 | A1* | 3/2007 | Caspi | H04M 3/56 709/204 |
| 2007/0112563 | A1 | 5/2007 | Krantz et al. | |
| 2008/0123563 | A1 | 5/2008 | Meyer et al. | |
| 2011/0286367 | A1 | 11/2011 | Lee et al. | |
| 2012/0170726 | A1* | 7/2012 | Schwartz | H04M 3/38 379/93.02 |
| 2013/0263216 | A1* | 10/2013 | Vakil | G06F 21/31 726/3 |
| 2014/0335838 | A1* | 11/2014 | Root | H04L 12/1827 455/416 |

FOREIGN PATENT DOCUMENTS

| | | |
|---|---|---|
| CN | 101364916 A | 2/2009 |
| JP | 2010098731 A | 4/2010 |
| JP | 2012234233 A | 11/2012 |
| WO | 2014101945 A1 | 7/2014 |

OTHER PUBLICATIONS

International Search Report and Written Opinion for corresponding Application No. PCT/US2014/046330, dated Oct. 28, 2014, 12 pages.

International Preliminary Report for corresponding Application No. PCT/US2014/046330, dated Jan. 21, 2016, 8 pages.

Sennheiser Electronic GMBH, "Wireless Conference System WICOS", Instruction manual, Apr. 30, 2009, pp. 1-90.

European Search Report for corresponding Application No. 14822334.0, dated Jan. 18, 2017, 6 pages.

* cited by examiner

Conference Workflow Manager

| Design Conference | Run Conference | Reports | Settings |

Run Conference

△ Run    ‖ Pause    ☐ Stop

Master View | Agenda | Delegates | Log | Projections

Views

Agenda

| Type | Topic | Duration (min) |
|---|---|---|
| Discussion | Topic A | 30 |
| Discussion | Topic B | 40 |
| Vote | Topic X | 10 |

Display Configuration

Speaker Lists:
- ☑ Waiting List
- ☐ Priority List
- ☐ Inactive Speakers
- ☑ Active Speakers
- ☑ Post Speakers

Speaker Lists

Waiting List

| Seat | Delegate | Waiting Time |
|---|---|---|
| C01 | Mr. Arty Ficial | 5.15 |
| C02 | Mr. Will Power | 1.00 |

Active Speakers

| Seat | Delegate | Speaking Time |
|---|---|---|
| C01 | Mr. Arty Ficial | 5.15 |
| C02 | Mr. Will Power | 1.00 |

Post Speakers

| Seat | Delegate | Duration |
|---|---|---|
| C01 | Mr. Arty Ficial | 5.15 |
| C02 | Mr. Will Power | 1.00 |

SYSTEM AND METHOD FOR DIGITAL AUDIO CONFERENCE WORKFLOW MANAGEMENT

CROSS-REFERENCE TO RELATED APPLICATIONS

This application is the U.S. national phase of PCT Application No. PCT/US2014/046330 filed on Jul. 11, 2014, which claims the benefit of U.S. Provisional Application No. 61/845,165 filed on Jul. 11, 2013, the disclosures of which are incorporated in their entirety by reference herein.

TECHNICAL FIELD

Aspects disclosed herein generally relate to a system and method for digital audio conference workflow management.

BACKGROUND

A digital audio conference unit includes a microphone, a speaker, and optional display and buttons for user input. A number of such conference units are networked together along with a central conference controller to form a conference system. The conference system facilitates a controlled discussion, voting, translation services, and remote dialing. The conference system as known today may not include adequate levels of conference setup configurability, testing, and control of the overall installation of devices.

SUMMARY

In one embodiment, a computer-program product embodied in a non-transitory computer read-able medium that is programmed to manage a digital audio conference including a plurality of conference units and each conference unit including a microphone is provided. The computer-program product comprises instructions to receive first information corresponding to a layout of a venue that facilitates an audio conference for users of the plurality of conference units. The computer-program product further comprises instructions to store second information corresponding to an arrangement of a plurality of seats in the venue and to associate a first conference unit of the plurality of conference units to a first seat of the plurality of seats.

In another embodiment, a method for managing a digital audio conference including a plurality of conference units and each conference unit including a microphone is provided. The method comprises electronically receiving first information corresponding to a layout of a venue that facilitates an audio conference for users of the plurality of conference units and electronically storing second information corresponding to an arrangement of a plurality of seats in the venue. The method further comprises electronically associating a first conference unit of the plurality of conference units to a first seat of the plurality of seats.

In another embodiment, an apparatus for use in a digital audio conference is provided. The apparatus comprises a conference unit including a microphone and is operably coupled to a conference controller that manages the audio conference. The conference unit is programmed to receive a first command from the conference controller to enable the microphone to receive a first audio signal from at least one first speaker in a venue for the audio conference and to transmit a sampled audio signal of the first audio signal to the conference controller to determine if the microphone for the conference unit is operating properly. The conference unit is further programmed to receive a second command from the conference controller to disable the microphone if the sampled audio signal is not similar to the first audio signal.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 8 depicts a voting setup function as provided by the DAC tool in accordance to one embodiment;

FIG. 10 depicts a master view of a run conference function as provided by the DAC tool in accordance to one embodiment;

FIG. 11 depicts a delegates view of the run conference function as provided by DAC tool in accordance to one embodiment;

DETAILED DESCRIPTION

Figure 1:
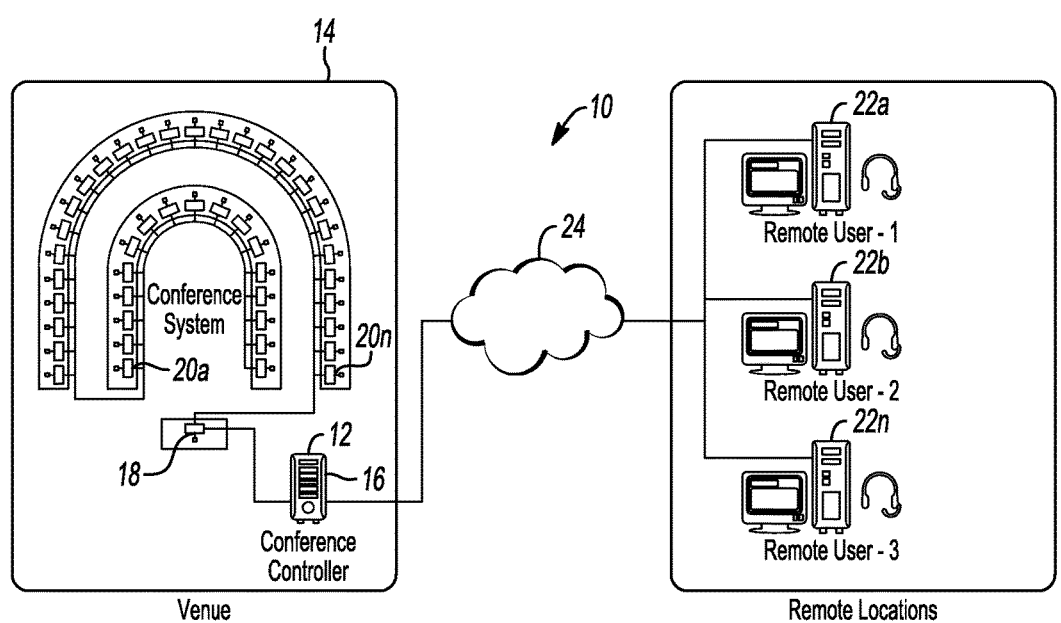
FIG. 1 depicts a digital audio conference (DAC) system in accordance to one embodiment.

As required, detailed embodiments of the present disclosure are provided herein; however, it is to be understood that the disclosed embodiments are merely illustrative of the disclosure that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired.

It is recognized that any circuit or other electrical device disclosed herein may include any number of microprocessors, integrated circuits, memory devices (e.g., FLASH, random access memory (RAM), read only memory (ROM), electrically programmable read only memory (EPROM), electrically erasable programmable read only memory (EEPROM), or other suitable variants thereof) and software which co-act with one another to perform operation(s) disclosed herein. In addition, any one or more of the electrical devices as disclosed herein may be configured to execute a computer-program that is embodied in a non-transitory computer readable medium that is programmed to perform any number of the functions as disclosed herein.

In general, the present disclosure provides a digital audio conference (DAC) tool that is executed on a conference controller for providing a streamlined workflow management of the DAC which starts, for example, by creating a visual representation of a venue to management of speakers during a live conference. The tool provides (via the conference controller), but not limited to, various methods to load a venue layout, automatically identify seats in a conference room, map seats to audio conference devices, interface with an integrated database (on the conference controller) to manage delegate information, visually allocate time to speak for each delegate linked to an agenda, create voting options, dynamically check status of the audio conference devices prior to starting a conference, run the conference in manual or in an auto-pilot mode, provide real time status of speakers (e.g., inactive, waiting, active, etc.) and to create, control, log and save various parameters before, during and after an audio conference. In addition, the tool enables data to be linked to a server for additional integration on delegate checkin, realtime information on updating/broadcasting on the status of the conference in addition to remote participation.

FIG. 1 depicts a digital audio conference (DAC) system 10 in accordance to one embodiment. The system 10 generally includes a conference controller 12 that is positioned in a venue 14 where an audio/video conference may take place. The conference controller 12 includes a DAC tool 16 for enabling a user to generate various aspects of workflow management of the A/V conference. In one example, the tool 16 may comprise logic and is embodied in a non-transitory computer readable medium that is programmed to perform any number of operations disclosed herein. The conference controller 12 includes hardware for executing the logic on the computer readable medium to perform the various operations disclosed herein. The conference controller 12 interfaces with the tool 16 to provide workflow management of the A/V conference in the venue 14. The conference controller 12 also includes a server (not shown) for storing and providing various aspects of the audio/video conference.

The conference controller 12 is operably coupled to a first conference unit 18. The first conference unit 18 is operably coupled to a plurality of second conference units 20a-20n ("20"). In general, each conference unit 18 and 20 includes a microphone, at least one speaker, a display, and switches for receiving user input. The conference units 18 and 20 form a network of conference units. In addition, the first conference unit 18 may include more functionality than one or more of the plurality of second conference units 20. For example, the first conference unit 18 may be allocated to a chairperson of a conference. In this case, the first conference unit 18 may include additional features to control the conference such as enabling/disabling a microphone (on a second conference unit 20), controlling an agenda, initiating voting, and controlling a transmission of data to projector(s), etc. One or more of the plurality of the second conference units 20 may be configured or set up as (i) a voting unit (where the participant may be enabled to vote on various issues presented in the conference) (ii) a delegate unit, or (iii) an interpreter unit (e.g., participant in conference can get live feed of audio that is translated in participant's native language). A delegate unit is generally a second conference unit 20 that enables an individual attending the conference to seek access to the microphone, speak when the microphone is activated, vote during the conference and also listen to the conference via the speaker.

The DAC system 10 further includes a plurality of remote conference units 22a-22n ("22") that is positioned outside of the venue 14. A communication bus 24 is operably coupled to the plurality of remote conference units 22a-22n for enabling data transfer between the conference controller 12, the first conference unit 18, the second plurality of conference units 20, and the plurality of conference units 22a-22n. In one example, the communication bus 24 may implement a Transmission Control Protocol/Internet Protocol (TCP/IP) (or other suitable alternative) for enabling communication between the conference controller 12, the first conference unit 18, the second conference units 20, and the remote conference units 22a-22n.

The tool 16 interfaces with the conference controller 12 to enable a user to provide workflow management of the A/V conference for the first conference unit 18 and the second conference units 20 in the venue 14 and for the plurality of remote conference units 22. The conference controller 12 may enable a user to (i) load a layout of the venue 14, (ii) automatically identify a seat in a conference room; (iii) associate the seat to a particular conference unit 20 and 22, (iv) interface with the server (e.g., an integrated database) to manage delegate information, (v) visually allocate time to speak for each delegate linked to an agenda and further linked to a particular conference unit 20 and 22, (vi) create similar or different voting options for each conference unit 20 and 22, (vii) dynamically check status of the conference units 20 and 22 prior to starting a conference, (viii) run the conference in manual or in an auto-pilot mode, (ix) provide real time status of speakers (e.g., inactive, waiting, active, etc.) and (x) create, control, log and save various parameters before, during and after an audio conference. In addition, the conference controller 12 enables data to be linked to the server of the conference controller 12 for additional integration on delegate check-in (e.g., users at corresponding conference units 20 and 22), real time information on updating/broadcasting status of the conference in addition to remote participation with the remote conference units 22.

Figure 2:
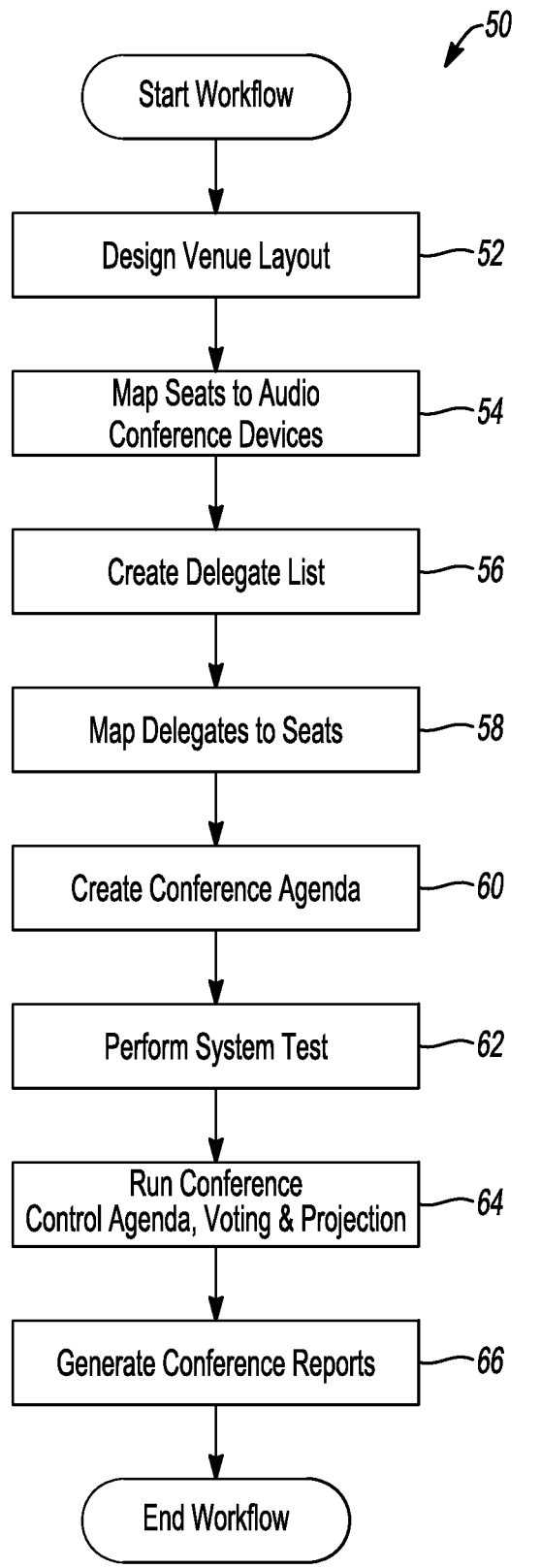
FIG. 2 depicts a DAC workflow in accordance to one embodiment.

FIG. 2 depicts a DAC workflow 50 in accordance to one embodiment.

Figure 3:
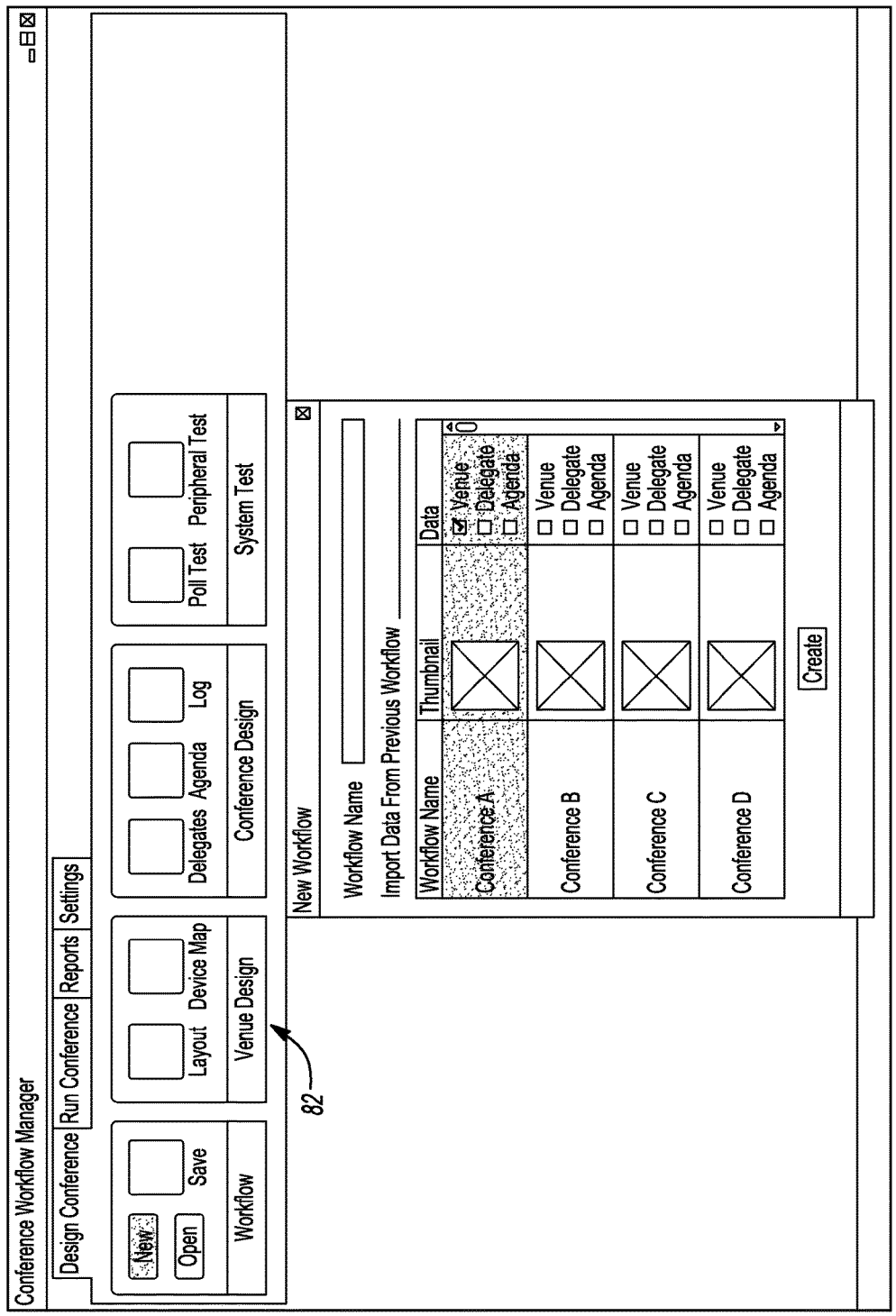
FIG. 3 depicts a file open function provided by a DAC tool in accordance to one embodiment.
Figure 4:
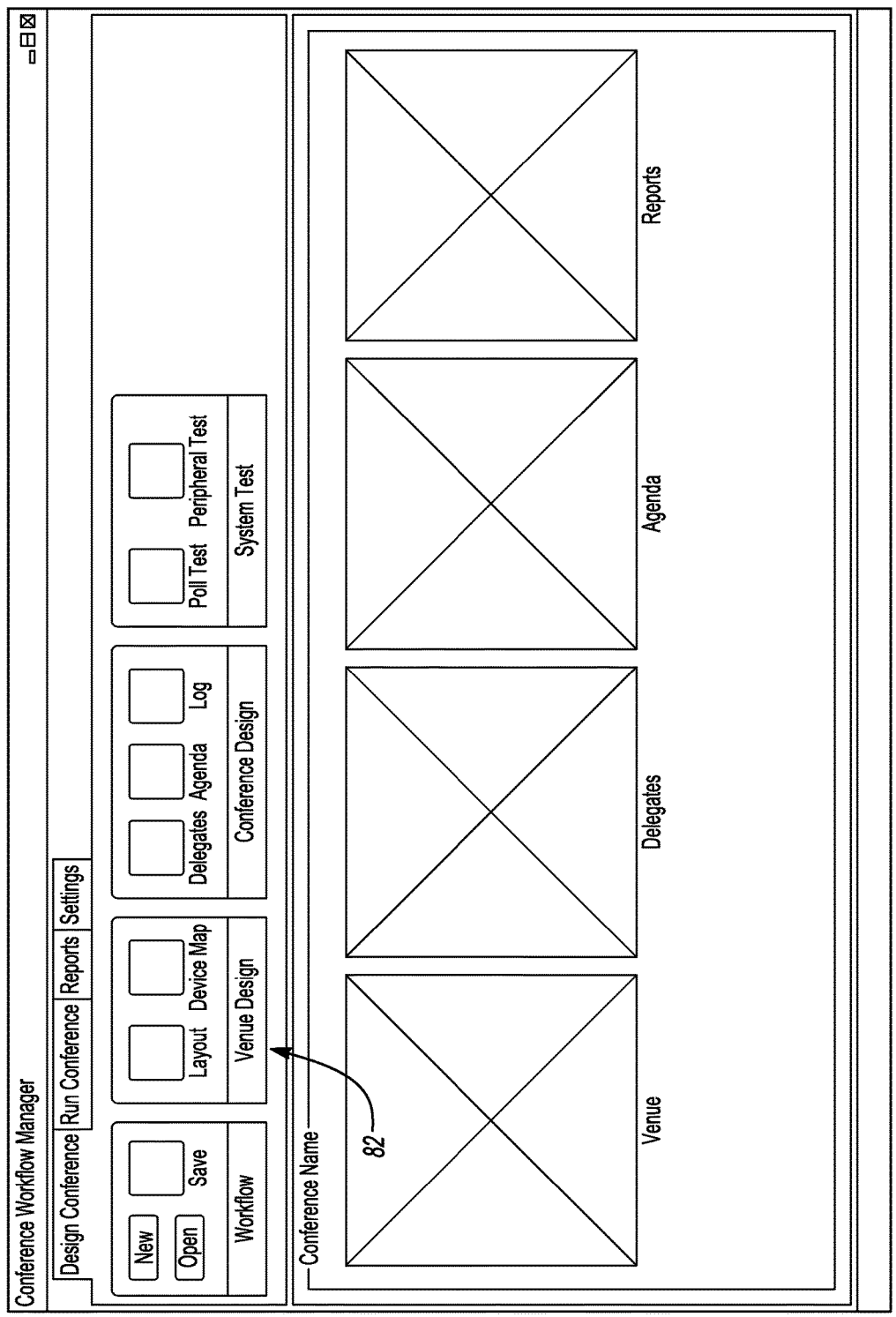
FIG. 4 depicts a venue, delegates, agenda, and reports screen for a selected conference name as generated by the DAC tool in accordance to one embodiment.

In operation 52, the conference controller 12 is configured to design a layout of the venue 14. For example, the conference controller 12 is configured to visually generate a rendering of the venue 14, a seating arrangement (or layout), and a distribution of the plurality of second conference units 20. An external device that is not part of the conference controller 12 may be used by the user to create a seating layout of the venue which can be uploaded into the conference controller 12 of the conference controller 12. For example, the external device may create the seating layout of the venue 14 in an electronic format (e.g., Portable Network Graphics (PNG), Joint Picture Experts Group (JPEG), Bitmap (BMP), etc.). The conference controller 12 may then upload the electronic version of the seating layout such that the conference controller 12 stores the same therein. The conference controller 12 includes an image processing algorithm integrated therein for parsing the image of the venue 14 to automatically identify seats, seat numbers, and one or more of the second conference units 20. FIGS. 3-4 as will be described in more detail below may be relevant to operation 52.

For example, FIG. 3 depicts a file open function 80 as provided by the conference controller 12 in accordance to one embodiment. The file open function 80 may be used to create a workflow name which can then include information or data related to the venue 14, delegate (e.g., seat number), and agenda (e.g., sequence of topics members of conference would like to discuss along with voting options for each member) for the conference that will occur. Such information may be saved in the conference unit 12. The user may select via the conference controller 12 a particular venue, seat number or delegate, and agenda to correspond to a particular work flow.

As shown, the conference controller 12 may create any number of workflow names that each correspond to a particular conference and venue. It is recognized that any number of venue layouts may be provided or stored in the conference controller 12. Field 82 as shown in FIG. 3 illustrates that the conference controller 12 provides a venue design option and device map layout. This will be discussed in more detail below.

In addition, FIG. 4 depicts a venue, delegates, agenda, and reports screen from the file open function of FIG. 3. The user may select via the conference controller 12 the venue, delegates, agenda, and various reports for the selected conference name. In general, the user may have a bird's eye view of the complete conference including a pictorial representation of the venue, a list of delegates, the agenda, and reports which in turn enables the user quick access to information.

Figure 5:
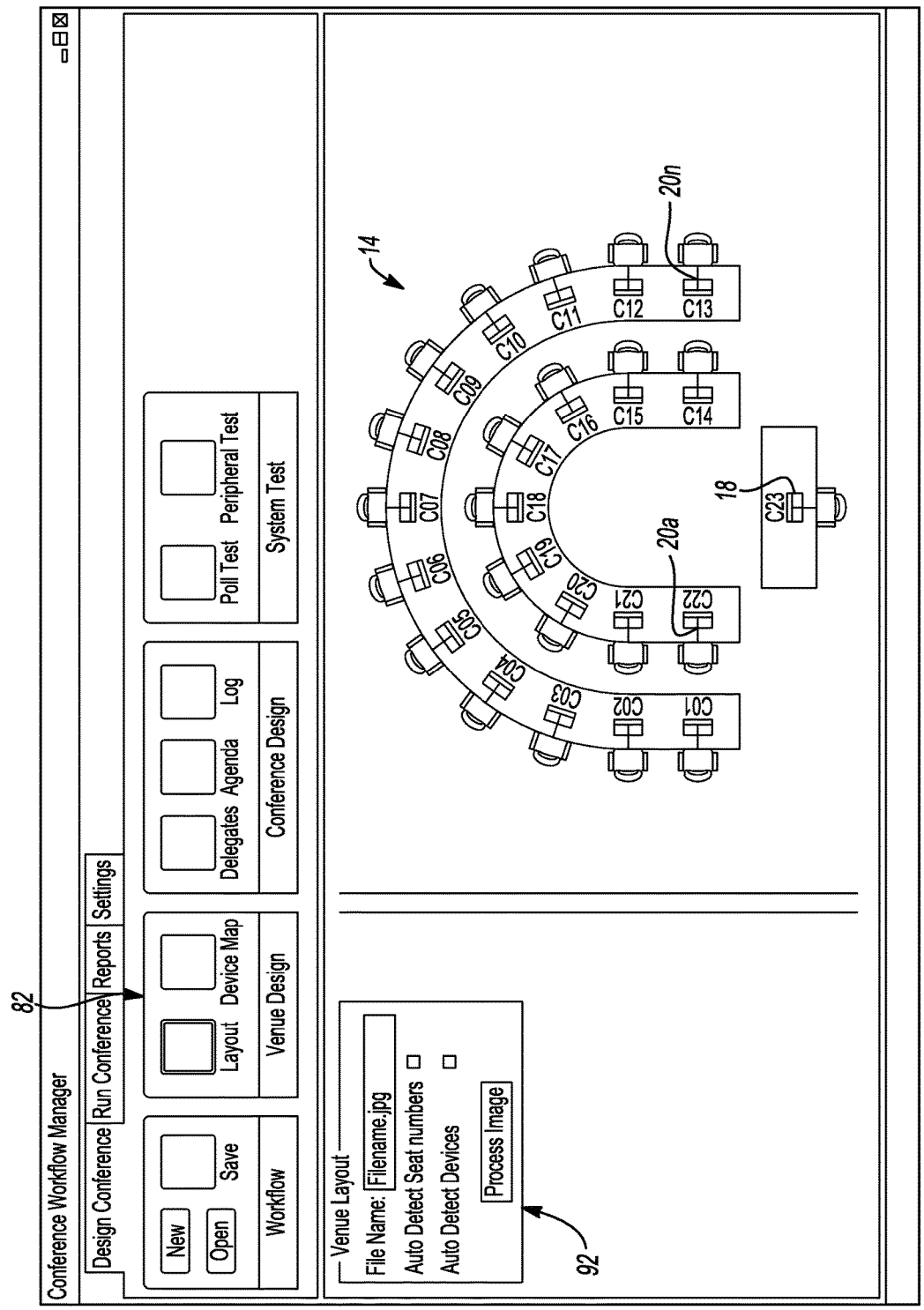
FIG. 5 depicts a layout design function as depicted in the DAC tool in accordance to one embodiment.

Referring back to FIG. 2, in operation 54, the conference controller 12 may map various seats as illustrated in the venue 14 to corresponding second conference units 20. This operation may be performed once the second conference units 20 are installed at the venue 14 and the mapping may be performed manually or via uploading, for example, with a text file such as but not limited to, comma-separated values (CSV) file. This condition is further illustrated in FIG. 5 which depicts a layout design function as provided in the conference controller 12 in accordance to one embodiment. As generally shown at field 92, when the layout is selected in the field 82, a file name is displayed which corresponds to the uploaded seating layout as noted above in connection with operation 52. As also shown at 92, the conference controller 12 may automatically detect seat numbers from the physical image of the venue layout and may also automatically detect device addresses 90 (see FIG. 6). As noted above, the conference controller 12 includes an image processing algorithm that analyzes the layout to identify objects and to compare each object with various predefined conference system objects as stored in the database (or server) to uniquely identify objects such as chairs, tables, projectors, number, and telephones, etc. In general, the device addresses 90 may correspond to a media access control (MAC) address which uniquely identifies a corresponding second conference unit 20.

Figure 6:
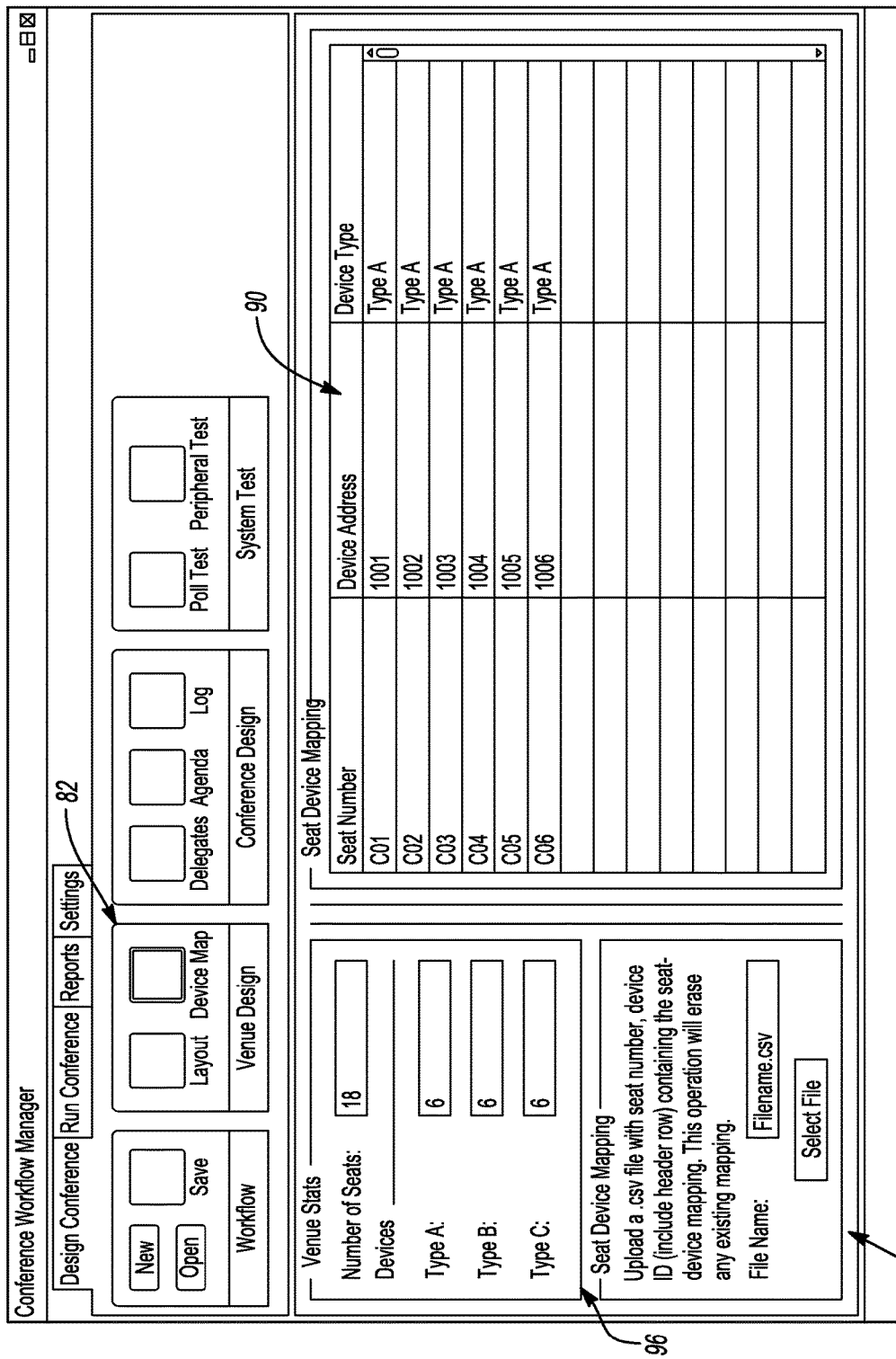
FIG. 6 depicts a set design mapping function as depicted in the DAC tool in accordance to one embodiment.

The seat mapping operation 54 as noted in connection with FIG. 2 is set forth in FIG. 6. Screen 94 generally depicts the various seat numbers (e.g., C01-C06) (or second conference units 20*a*-20*n*) with associated device addresses 90 and device types (e.g., "Type A"). The device type is also associated with a corresponding conference unit 20. The conference controller 12 generates the screen 94 in response to "device map" being selected in field 82. In general, the device type corresponds to various types (e.g., A, B, C) as generally shown at 96. In one example, a "Type A" conference unit 20 may be configured to enable a voting option, a "Type B" conference unit 20 may be configured as the delegate unit, and a "Type C" conference unit 20 may be configured to provide translations to the attendee seated at the seat number. It is recognized that the second conference unit 20 may not perform the translation per se. However, the Type C conference unit 20 is configured to provide translated audio while a professional translator who is present at the venue 14 articulates the translation in real time which is broadcast to the Type C conference unit 20. As generally shown at 98, a user may upload the text file (e.g., CSV file) to the conference controller 12 to perform the mapping of the seat number and device address.

Referring back to FIG. 2, in operation 56, the conference controller 12 creates a delegate list. In this case, the conference controller 12 creates a table for storage on the server including the delegates attending the conference and may optionally pre-assign each delegate to a particular seat (or second conference unit 20). Additional information about the delegate, such as the name, contact details, photo, etc. can be provided to the conference controller 12 to be shared across the system 10.

Figure 7:
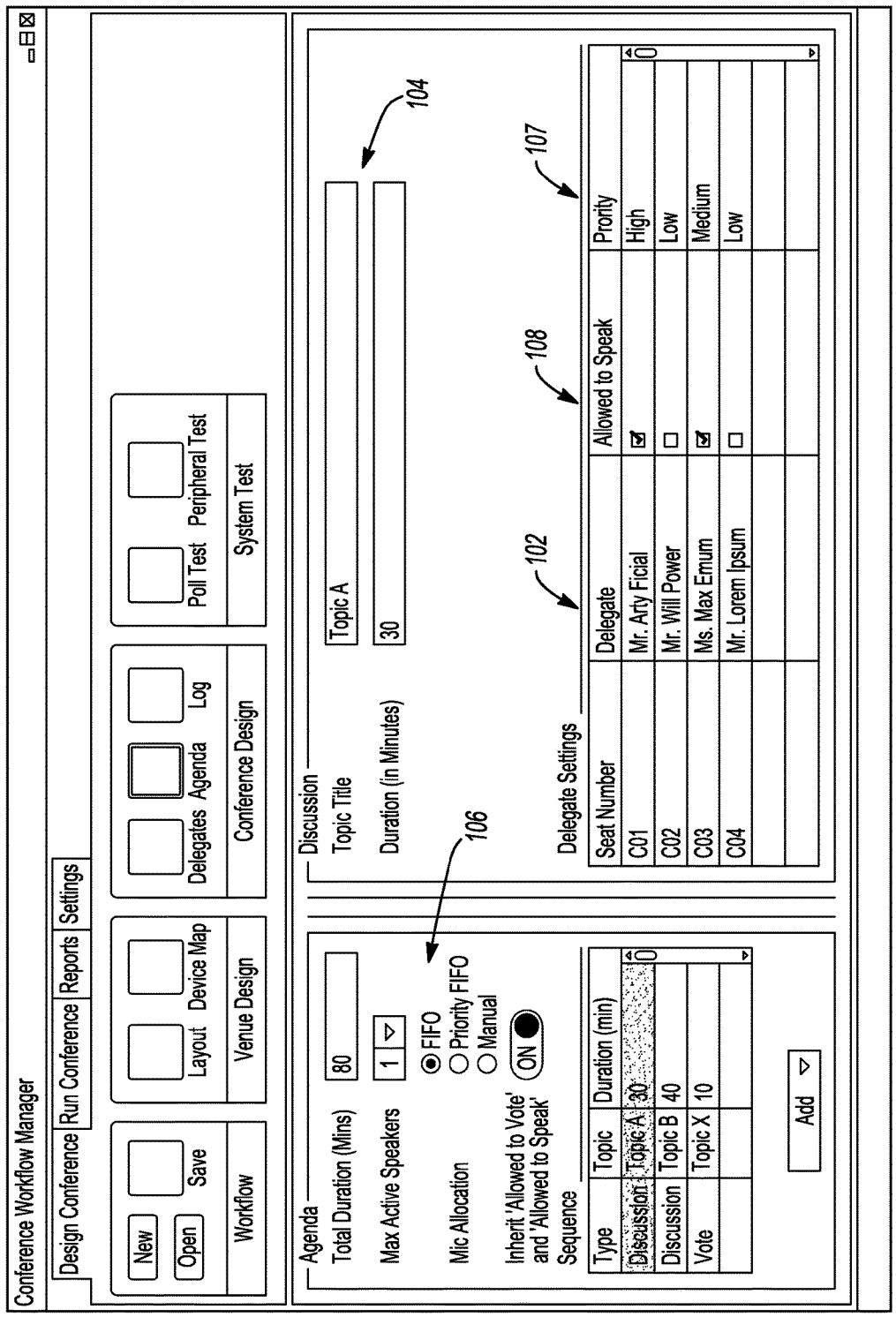
FIG. 7 depicts a topic setup function as provided by the DAC tool in accordance to one embodiment.

In operation 58, the conference controller 12 maps (or assigns) the delegates to their respective seats. This condition is generally shown at 102 in FIG. 7. It is recognized that the conference controller 12 may associate any number of associations for both the delegates and seats.

Figure 8:
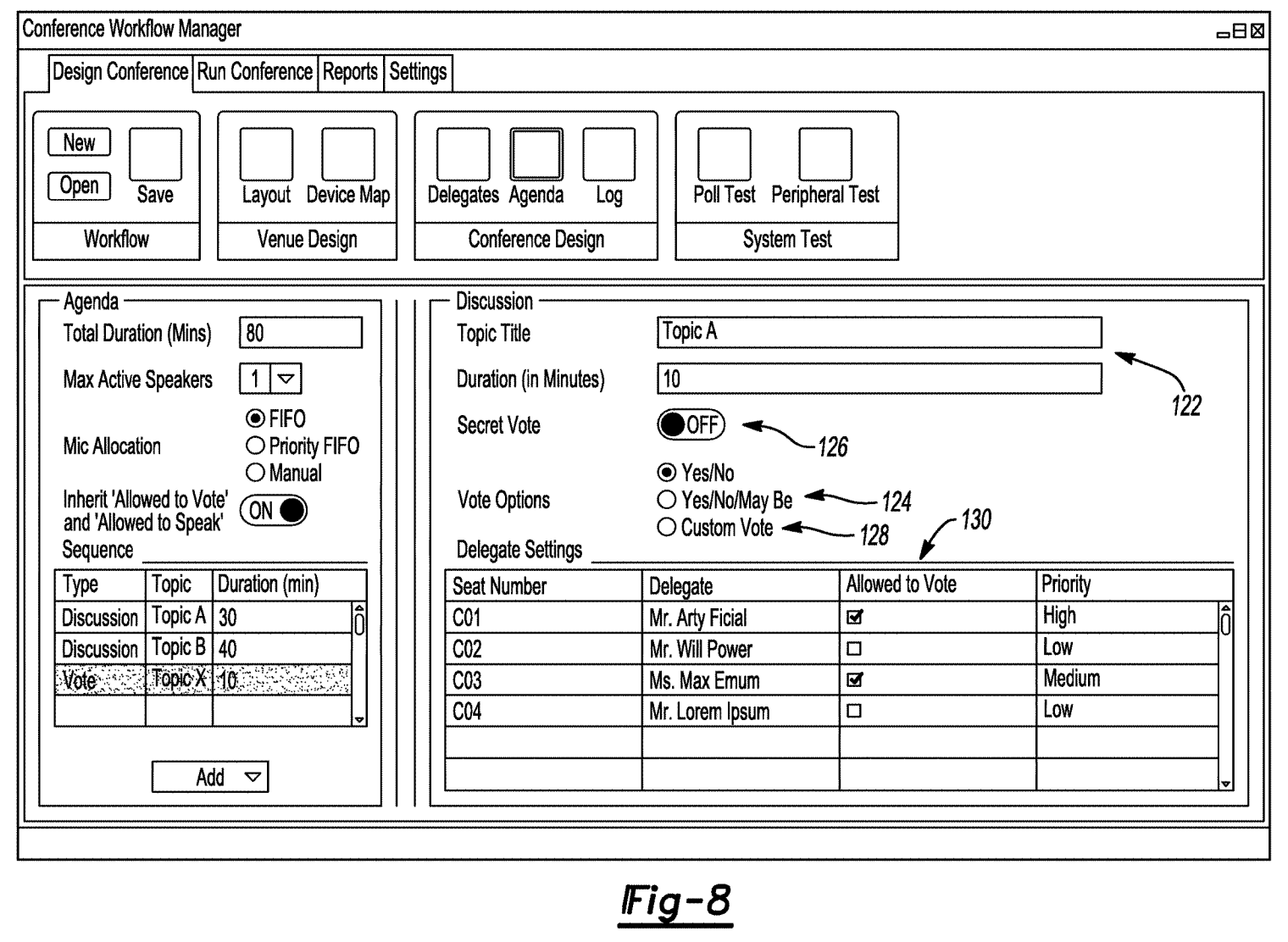

Referring back to FIG. 2, in operation 60, the conference controller 12 may create an agenda for the conference. In general, a conference typically includes a sequence of topics for discussion and voting. The conference controller 12 enables the user to create an agenda with a topic for discussion, topic duration (see FIG. 7 at 104 for topic of discussion and duration), microphone allocation (see FIG. 7 at 106 for allocation), strategy, priority of delegates (see FIG. 7 at 107—microphone allocation priorities—higher ranking attendee granted priority to speak over lower ranking attendee (e.g., president can speak first at any time (e.g., priority first in first out) while mayor can speak if next in turn so long as president is not speaking)), and preventing various delegates from not speaking at all (or allowing delegates the opportunity to speak) (see FIG. 7 generally at 108), topics open to vote (see FIG. 8, generally at 122), vote options (see FIG. 8, generally at 124), and voting type (e.g., secret or public) (see FIG. 8, generally at 126).

It is recognized that the conference controller 12 may communicate with the various second conference units 20 for enforcing the (i) topic for discussion, (ii) topic duration, (iii) microphone allocation, (iv) speaking privileges, (v) topic open to vote, (vi) vote options, etc. once identified in the conference controller 12. The conference controller 12 also provides for the selection of a custom vote (see FIG. 8, generally at 128) in which the user can configure a vote option as "yea' or "nay" etc. The conference controller 12 also allows the user to identify which delegate is allowed to vote (see FIG. 8, generally at 130). Again, the information as input into the conference controller 12 may be transmitted to the various second conference units 20 to perform a various operation as instructed by the conference controller 12. For example, assuming delegate Mr. Will Power is identified as a delegate that is not allowed to vote (see FIG. 8, generally at 130), the conference controller 12 may then transmit such information to the second conference unit 20 positioned at seat number "C02". In this case, the second conference unit 20 assigned to the seat number "C02" will prevent Mr. Will Power from voting. In general, the various second conference units 20 (and/or remote conference units 22) will enforce or perform operations as provided by the conference controller 12 in accordance to those specified by the user in the conference controller 12.

Referring back to FIG. 2, in operation 62, the conference controller 12 is configured to provide feedback on a system test that is performed in the system 10. For example, the conference controller 12 may interface with the first conference unit 18, the second conference units 20, and the remote conference units 22 to test various aspects (or perform a poll test) of the same prior to running a live conference. The conference controller 12 may detect or identify various units 18, 20, and 22 with various faults so that a system engineer is capable of resolving such faults prior to the conference. The conference controller 12 may individually poll each conference unit 18, 20, and 22 to test connectivity, microphone, speaker, etc. as associated with each conference unit 18, 20, and 22 and generates a detailed report which identifies if faults were found during the poll test.

Figure 9:
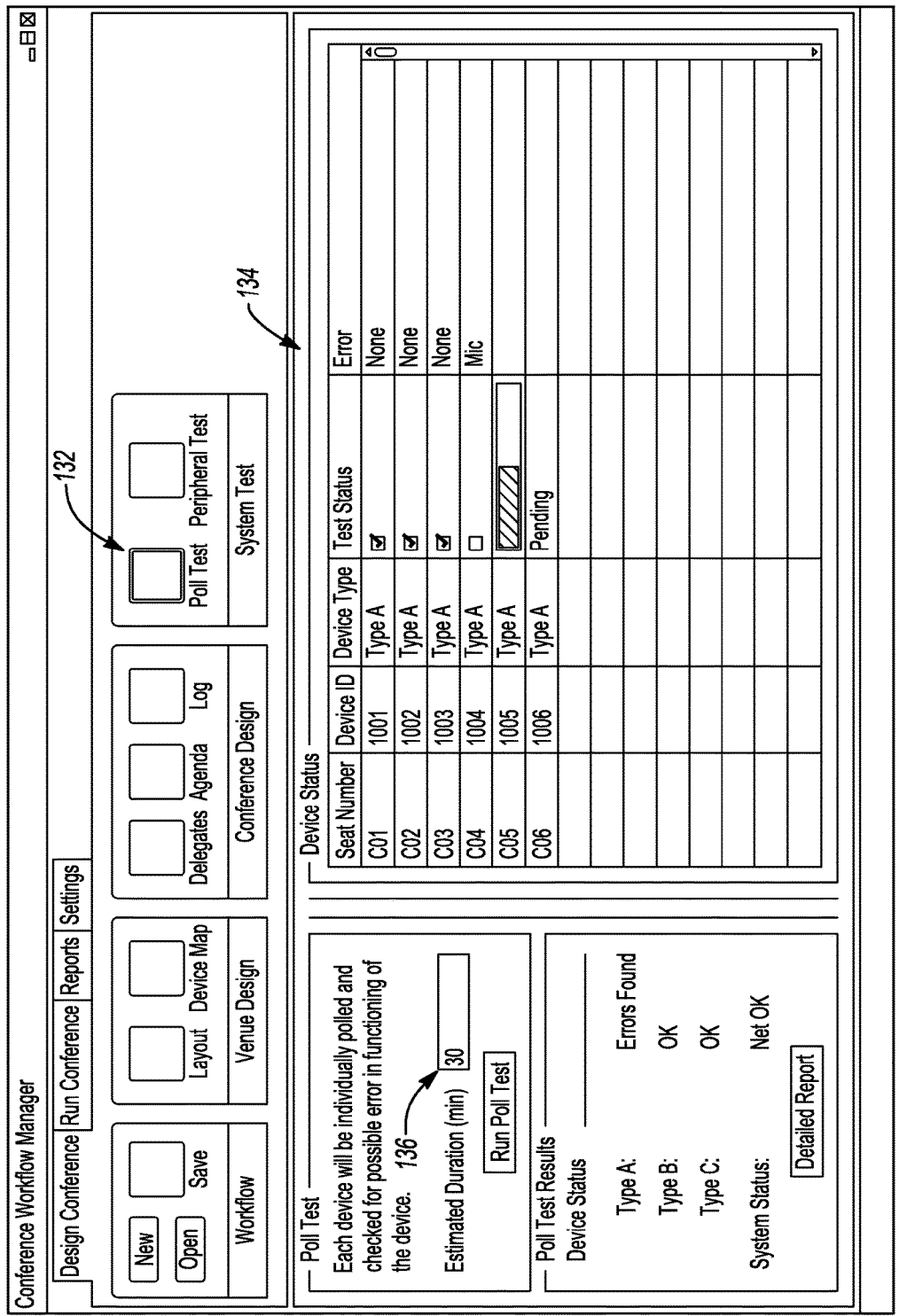
FIG. 9 depicts a poll test function as provided by the DAC tool in accordance to one embodiment.

FIG. 9 depicts a test status as provided by the conference controller 12 in accordance to one embodiment. As generally shown at 132, the user may select the poll test option such that the conference controller 12 interfaces with the various units 18, 20, and 22 to perform the poll test. As generally shown at 134, the conference controller 12 provides a listing of the test status for each device (or unit 18, 20, and 22) that is tested and further indicates if any errors were found and what the error relates to (e.g., microphone, etc.). As generally shown at 136, the conference controller 12 also provides/displays an estimated duration for the poll test as it is being performed on a particular conference unit 18, 20, and 22. One example of the manner in which the poll test is executed is set forth in connection with FIG. 14 which will be described in more detail below.

Figure 10:
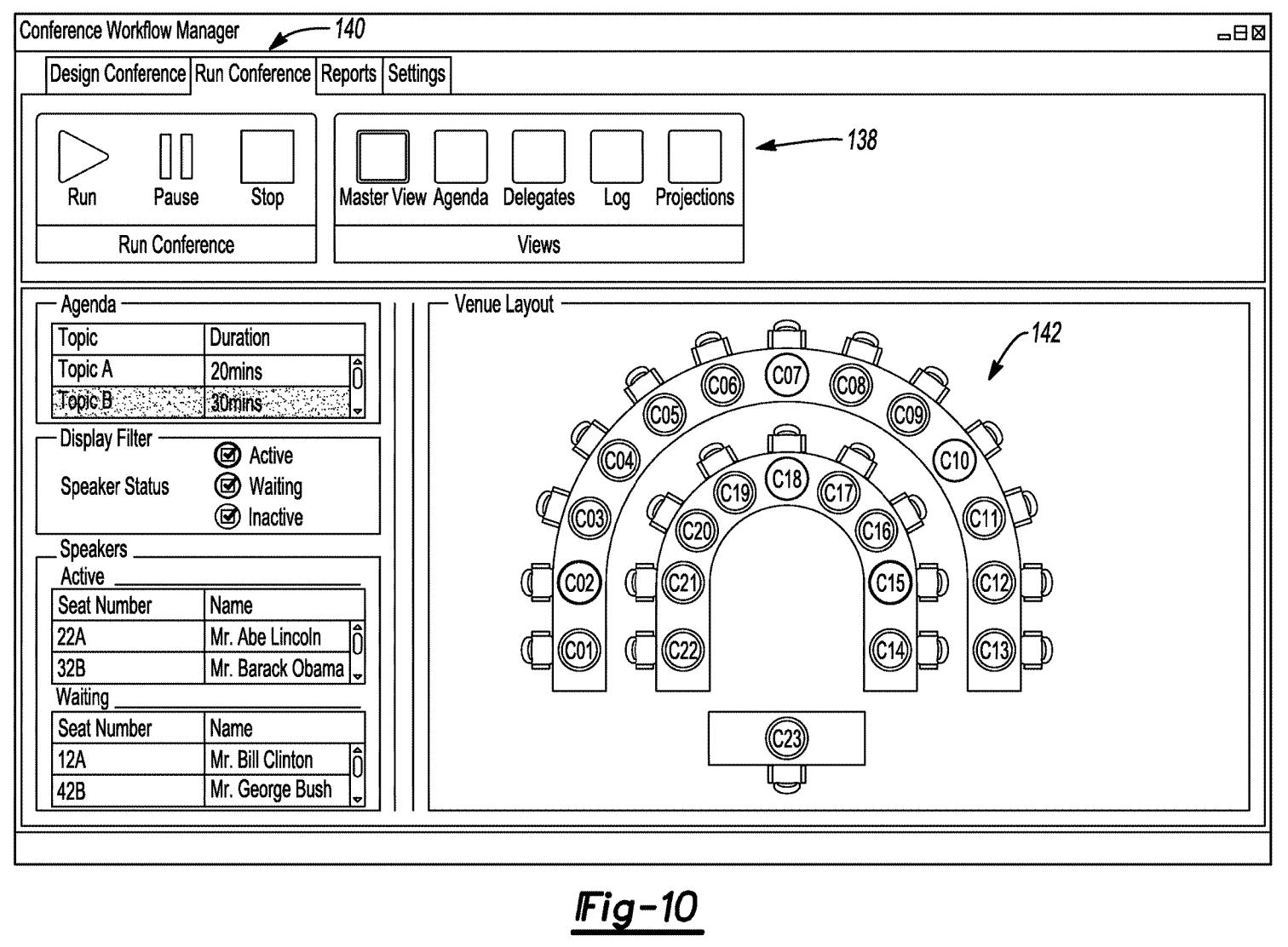

Referring back to FIG. 2, in operation 64, the conference controller 12 provides multiple views of various aspects of the system 10 (e.g., master view, agenda, delegates, log, and projections) (see FIG. 10, generally at 138). The conference controller 12 also provides for a run conference function (see FIG. 10, generally at 140) which enables control over the conference (e.g., start, pause and stop a conference) The venue 14 will be electronically displayed on the conference controller 12 (see FIG. 10, generally at 142) along with the pre-defined agenda for the conference. FIG. 11 depicts a screen of the conference controller 12 when the conference is active (or has started). As generally shown at 144, various speaker lists are provided on the conference controller 12 which indicate (i) which speaker is on a waiting list, (ii) current or active speakers, and (iii) past speakers.

Figure 12:
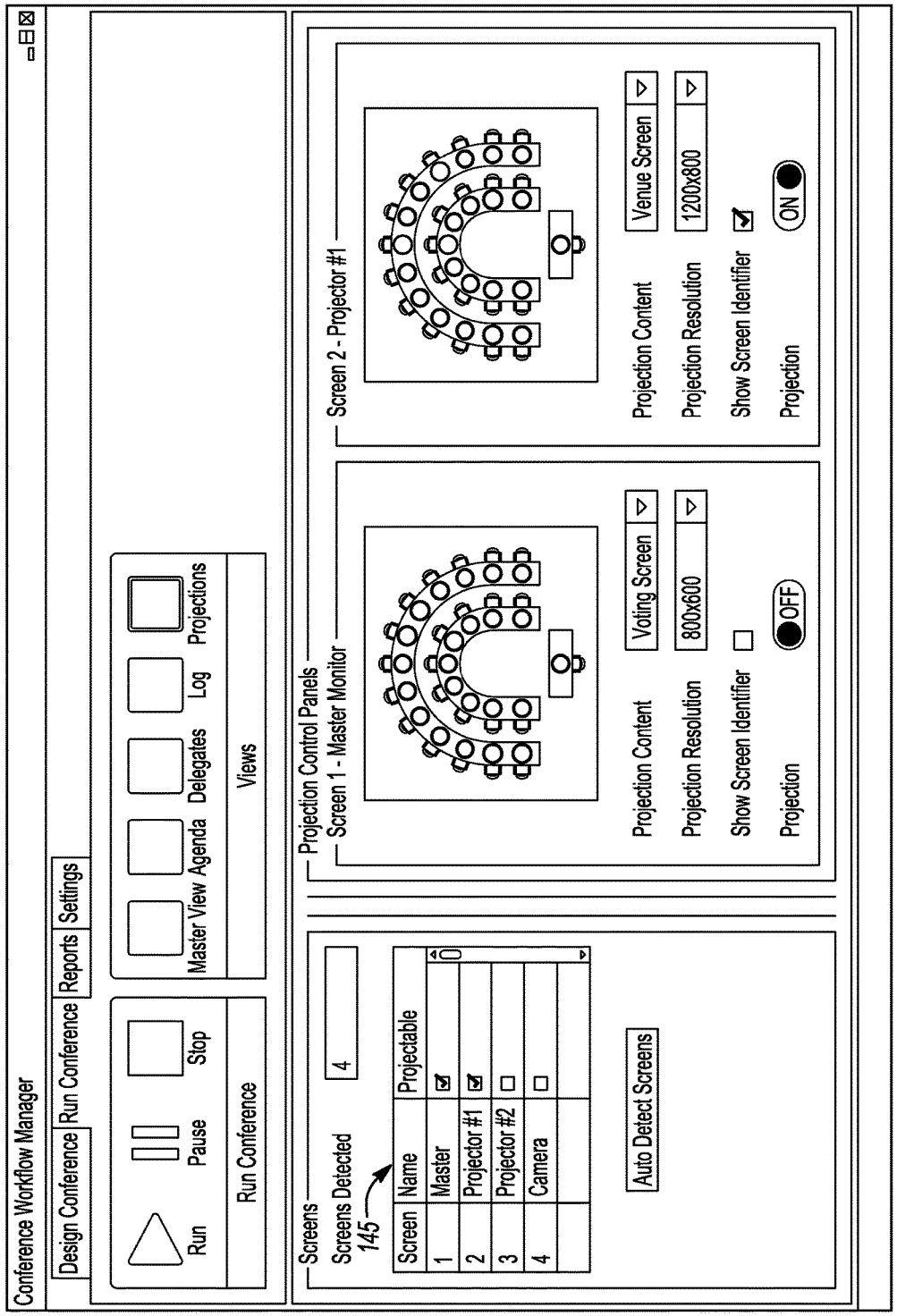
FIG. 12 depicts a projection view of the run conference function as provided by the DAC tool in accordance to one embodiment.
Figure 13:
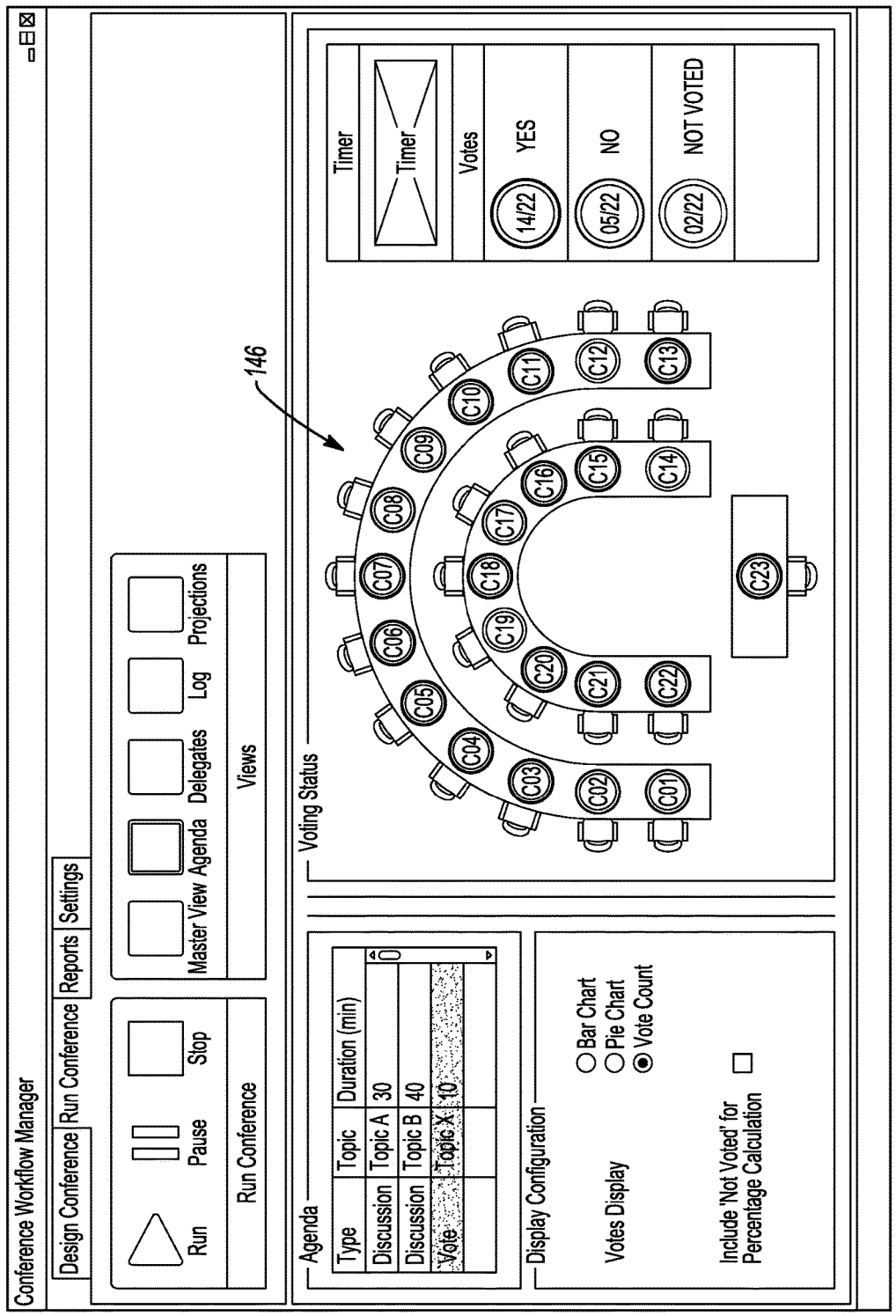
FIG. 13 depicts a generate conference report function as provided by the DAC tool in accordance to one embodiment.

FIG. 12 depicts a projection view as provided on the conference controller 12 while the conference is active. The projection view provides an indication as to which screen is projectable (see 145). As shown, a master screen and a projector #1 are indicated to be projectable on a screen if so desired at the conference. FIG. 13 depicts a voting view as provided on the conference controller 12 while members of the conference vote on a particular issue. As shown at 146, the manner in which a particular delegate has voted on a topic is displayed and the overall vote count is maintained while the voting period is open. In addition, the vote count may be displayed as a bar chart, a pie chart, or vote count.

Referring back to FIG. 2, in operation 66, the conference controller 12 enables the user to generate reports associated with the conference such as attendee lists, voting results, etc.

Figure 14:
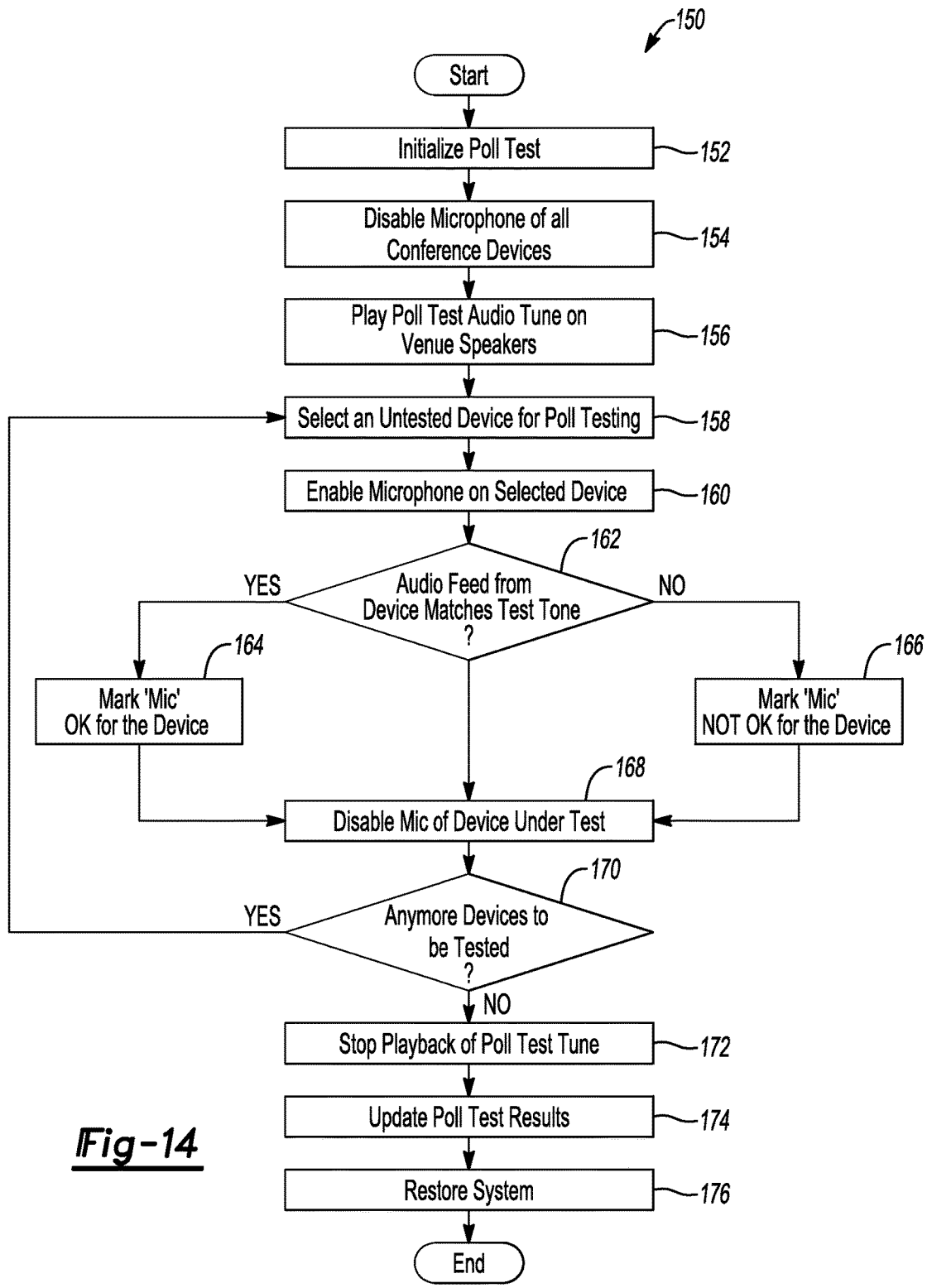
FIG. 14 depicts a method for performing the poll test in accordance to one embodiment.

FIG. 14 depicts a method 150 for performing the poll test at any one or more of the units 18, 20, and 22 as initially discussed with the poll test in connection with operation 62 of FIG. 2.

In operation 152, the conference controller 12 initializes the poll test in the system 10.

In operation 154, the conference controller 12 transmits a command to the various units 18 and 20 to disable the microphone for each of such units.

In operation 156, the conference controller 12 controls venue speakers to play an audio tune. The venue speakers are within the venue 14 (or conference hall) and are linked to a public address system within the venue 14 or hall.

In operation 158, the conference controller 12 selects one of the conference units 18, 20 to perform the poll test.

In operation 160, the conference controller 12 controls the selected conference unit 18, 20 to enable or activate the microphone for receiving an audio input indicative of the audio tune as provided in operation 156.

In operation 162, the conference controller 12 receives a sampled audio signal from the selected conference unit 18, 20 to determine if the tone as provided on the sampled audio signal matches the audio tune as played in connection with operation 156. If this condition is true, then the method 150 moves to operation 164. If not, then the method 150 moves to operation 166.

In operation 164, the conference controller 12 indicates that the microphone for the selected conference unit 18, 20 has passed the test.

In operation 166, the conference controller 12 indicates that the microphone for the selected conference unit 18, 20 is exhibiting a fault condition.

In operation 168, the conference controller 12 disables the microphone under the test for the selected conference unit 18, 20. In this case, the conference controller 12 transmits the command to the selected conference unit 18, 20 to disable the microphone thereof.

In operation 170, the conference controller 12 determines if there are any additional conference units 18, 20 that need to be tested. If this condition is true, then the method 150 moves back to operation 158. If not, then the method 150 moves to operation 172.

In operation 172, the conference controller 12 stops the playback of the audio tune on the venue speakers.

In operation 174, the conference controller 12 provides the results of the poll test for all of the selected conference units 18, 20.

In operation 176, the conference controller 12 restores the system 10.

Figure 15:
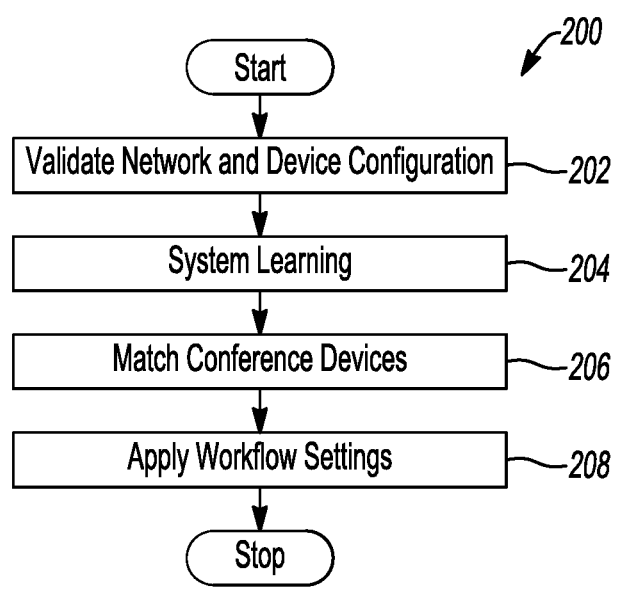
FIG. 15 depicts a method for executing an on-line wizard in accordance to one embodiment.

FIG. 15 depicts a method 200 for executing an on-line wizard in accordance to one embodiment. As noted above, the conference controller 12 provides a file open function which enables a user to create a workflow (i.e., information or settings related to the venue 14, delegate (e.g., seat number), and agenda (e.g., sequence of topics members of conference would like to discuss along with voting options for each member) for the conference that will occur for the conference, etc.). As the user creates the at least portions of the conference workflow, the conference controller 16 may not be communicating to the first conference unit 18 and to the second conference units 20a-20n. The conference controller 12 may be controlled to execute the on-line wizard once it has been determined that information can be transmitted to the first conference unit 18 and the second conference units 20a-20n.

In operation 202, the conference controller 12 checks for a valid network and device configuration. For example, the conference controller 12 checks network connectivity and matches device configurations with the first conference unit 18 and the second conference units 20a-20n (and optionally the remote conference units 22a-22n). This operation ensures that there is a match between the conference controller 12, the first conference unit 18, and the second conference units 20a-20n.

In operation 204, the conference controller 12 performs system 10 learning. For example, the first conference unit 18 and/or the second conference units 20a-20n may be in "an unlearned state" which means that such units may not have a physical network address assigned. The conference controller 12 checks for this state and automatically initiates "an auto learning" operation so that all of the units 18, 20a-20n, and/or 22a-22n have an address assigned thereto and that the system 10 as a whole is stable.

In operation 206, the conference controller 12 matches the various conference units 18, 20a-20n, and 22a-22n as detected in the network (i.e., when the conference controller 12 is on-line) to the various conference units 18, 20a-20n, and 22a-22n as established when the conference controller 12 is off-line. For example, the conference controller 12 matches the conference units 18, 20a-20n, and 22a-22n as electronically detected in the system 10 to the various conference units 18, 20a-20n, and 22a-22n established when the conference controller 12 is off-line to determine if there is a match. If there is a mismatch, the conference controller 12 may automatically resolve the mismatch or prompt the user to resolve the mismatch.

In operation 208, the conference controller 12 may then apply the various settings or information such as but not limited to, volume level, system timers, device (or conference unit) availability, voting options, etc. for the particular units 18, 20a-20n, and 22a-22n.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-program product embodied in a non-transitory computer read-able medium that is programmed to manage a digital audio conference including a plurality of conference units and each conference unit including a microphone, the computer-program product comprising instructions to:
   receive first information corresponding to a layout of a venue that facilitates an audio conference for users of the plurality of conference units;
   store second information corresponding to an arrangement of a plurality of seats in the venue;
   associate a first conference unit of the plurality of conference units to a first seat of the plurality of seats;
   transmit third information corresponding to a topic for discussion in the audio conference to the plurality of conference units and further corresponding to a duration of the topic in the audio conference;
   test the microphone for the conference unit in the audio conference to determine whether the microphone for the conference unit is exhibiting a fault condition;
   transmit a command to each of the plurality of conference units to disable the microphone for each of the plurality of conference units prior to testing the microphone;
   control one or more first speakers within the venue to transmit a first audio signal;
   control a corresponding conference unit of the plurality of conference units to activate the microphone;
   receive a sampled audio signal of the first audio signal from the corresponding conference unit after controlling the corresponding conference unit to activate the microphone; and
   compare a tone on the sampled audio signal to a portion of the first audio signal to determine if the microphone for the corresponding conference unit is operating properly.

2. The computer-program product of claim 1 further comprising instructions to create a listing of the users and to pre-assign each user to a corresponding conference unit.

3. The computer-program product of claim 2 further comprising instructions to assign at least one of a voting option for one or more of the users and a speaking privilege for the one or more of the users, wherein the voting option enables a first user to vote on a topic at the audio conference at first conference unit and prevents a second user from voting on the topic at the audio conference at a second conference unit.

4. The computer-program product of claim 2 further comprising instructions to assign microphone allocation priorities for each of the users, wherein the microphone allocation priorities enable a first user the ability to speak at the microphone of a first conference unit and prevents a second user the ability to speak at the microphone of a second conference unit if the second user is attempting to speak at the microphone at a same time the first user is attempting to speak at the microphone.

5. The computer-program product of claim 1 further comprising instructions to determine that the microphone for the corresponding conference unit is not properly working if the tone of the sampled audio signal is not the same as the portion of the first audio signal.

6. The computer-program product of claim 5 further comprising instructions to determine that the microphone for the corresponding conference unit is properly working if the tone of the sampled audio signal is similar to the portion of the first audio signal.

7. A method for managing a digital audio conference including a plurality of conference units and each conference unit including a microphone, the method comprising:
   electronically receiving first information corresponding to a layout of a venue that facilitates an audio conference for users of the plurality of conference units;
   electronically storing second information corresponding to an arrangement of a plurality of seats in the venue;
   electronically associating a first conference unit of the plurality of conference units to a first seat of the plurality of seats;
   transmitting third information corresponding to a topic for discussion in the audio conference to the plurality of conference units and further corresponding to a duration of the topic in the audio conference;

testing the microphone for the conference unit in the audio conference to determine whether the microphone for the conference unit is exhibiting a fault condition;

transmitting a command to each of the plurality of conference units to disable the microphone for each of the plurality of conference units prior to testing the microphone;

controlling one or more first speakers within the venue to transmit a first audio signal;

controlling a corresponding conference unit of the plurality of conference units to activate the microphone;

receiving a sampled audio signal of the first audio signal from the corresponding conference unit after controlling the corresponding conference unit to activate the microphone; and comparing a tone on the sampled audio signal to a portion of the first audio signal to determine if the microphone for the corresponding conference unit is operating properly.

8. The method of claim 7 further comprising creating a listing of the users and to pre-assign each user to a corresponding conference unit.

9. The method of claim 8 further comprising assigning at least one of a voting option for one or more of the users and a speaking privilege for the one or more of the users, wherein the voting option enables a first user to vote on a topic at the audio conference at first conference unit and prevents a second user from voting on the topic at the audio conference at a second conference unit.

10. The method of claim 9 further comprising assigning microphone allocation priorities for each of the users, wherein the microphone allocation enables a first user the ability to speak at the microphone of a first conference unit and prevents a second user the ability to speak at the microphone of a second conference unit if the second user is attempting to speak at the microphone at a same time the first user is attempting to speak at the microphone.

11. The method of claim 7 further comprising determining that the microphone for the corresponding conference unit is not properly working if the tone of the sampled audio signal is not the same as the portion of the first audio signal.

12. An apparatus for use in a digital audio conference, the apparatus comprising:

a conference unit including a microphone that is operably coupled to a conference controller that manages the audio conference; the conference unit being programmed to:

receive a first command from the conference controller to enable the microphone to receive a first audio signal from at least one first speaker in a venue for the audio conference;

transmit a sampled audio signal of the first audio signal to the conference controller to determine if the microphone for the conference unit is operating properly; and receive a second command from the conference controller to disable the microphone in response to the sampled audio signal not being similar to the first audio signal, wherein the second command is indicative of the microphone for the conference unit not operating properly.

* * * * *